Figure 1:
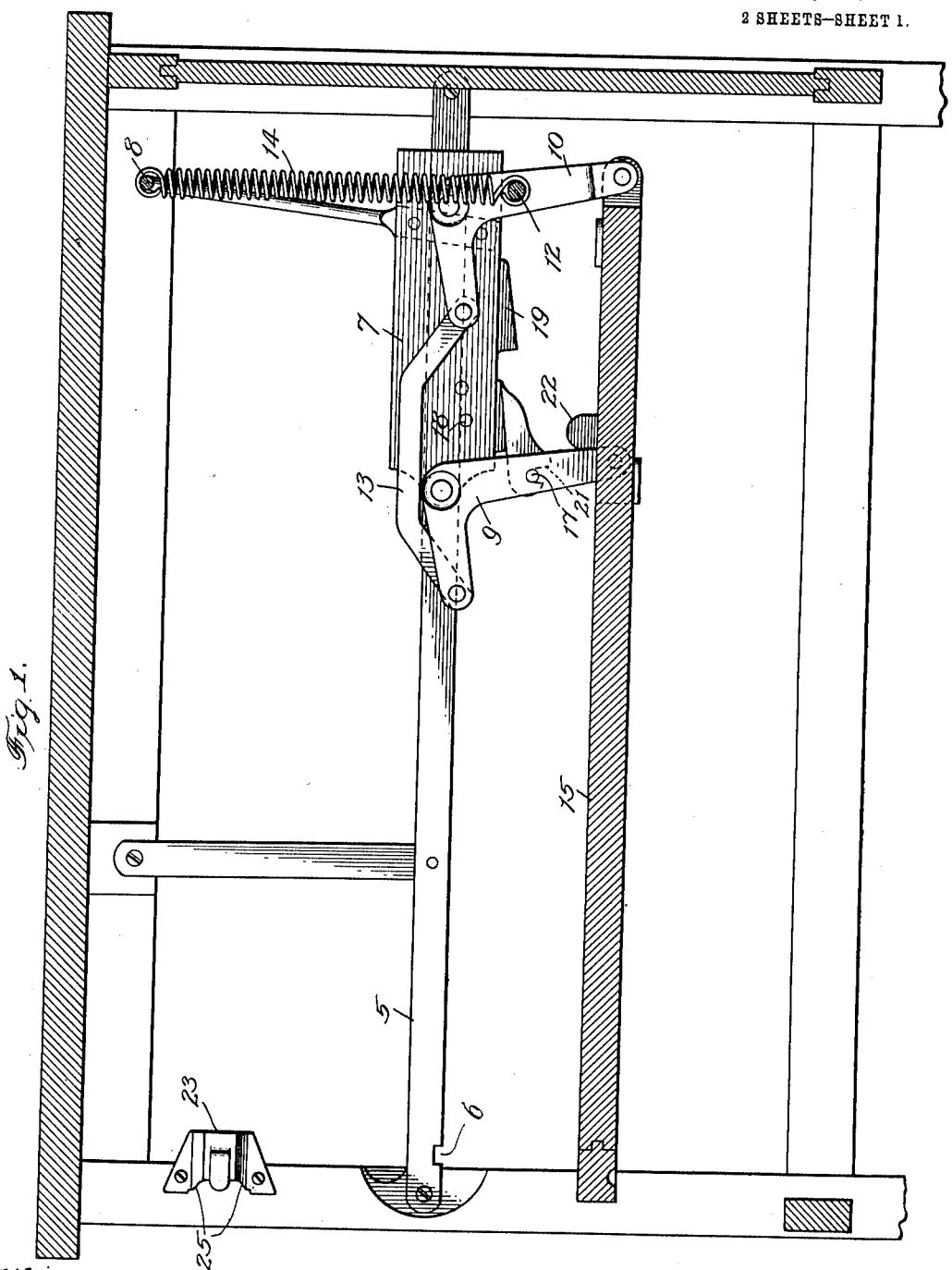

J. VAALER.
LATCH FOR TYPE WRITER DESK PLATFORMS.
APPLICATION FILED AUG. 12, 1912.

1,061,707.

Patented May 13, 1913.

2 SHEETS—SHEET 1.

Witnesses:
Chas. H. Buell
G. F. Chase

Inventor:
Jens Vaaler,
By Dyrenforth, Lee, Chritton & Wiles
Attys.

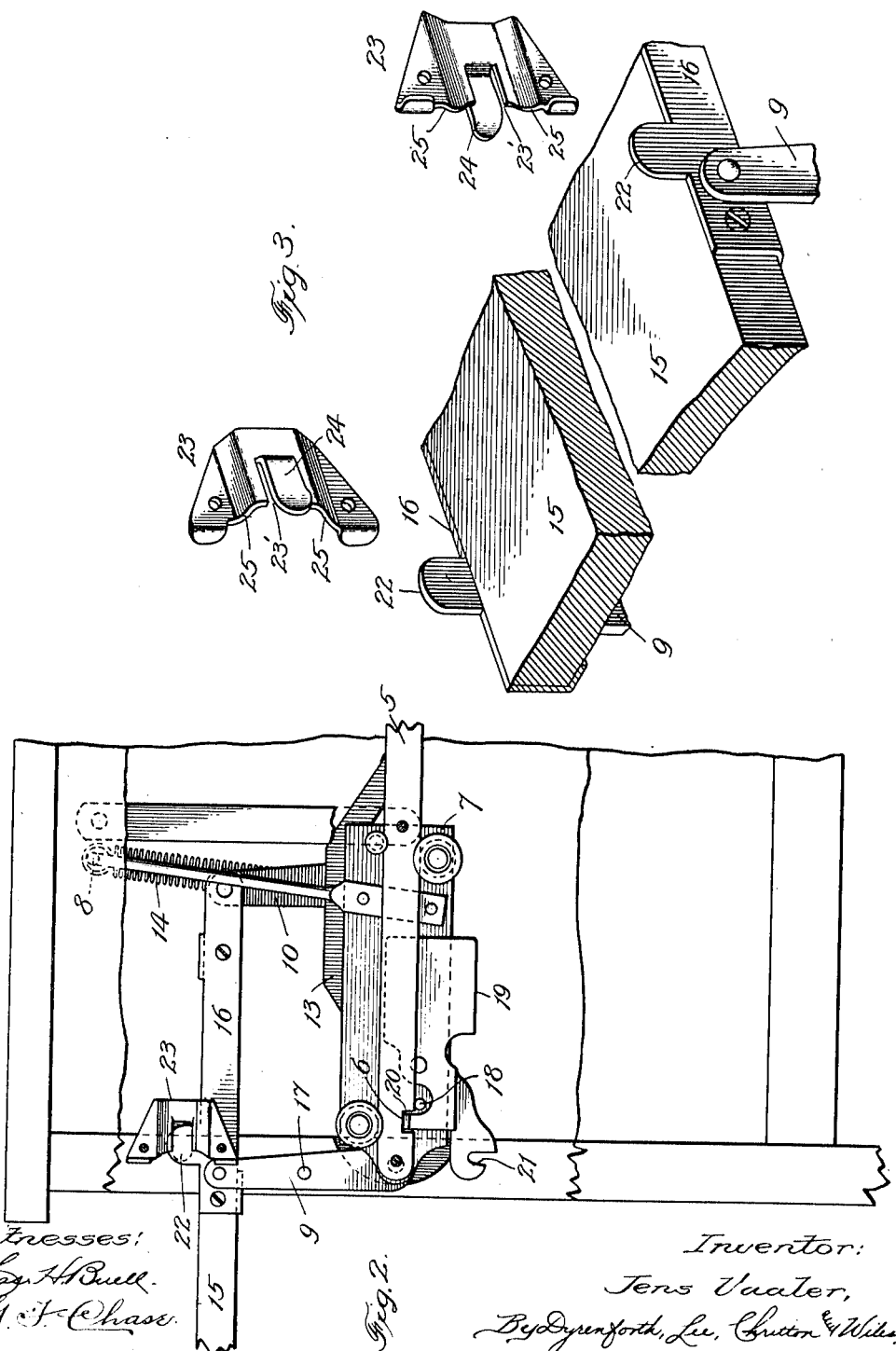

UNITED STATES PATENT OFFICE.

JENS VAALER, OF CHICAGO, ILLINOIS, ASSIGNOR TO THE CLEMETSEN COMPANY, OF CHICAGO, ILLINOIS, A CORPORATION OF ILLINOIS.

LATCH FOR TYPE-WRITER-DESK PLATFORMS.

1,061,707. Specification of Letters Patent. Patented May 13, 1913.

Original application filed May 11, 1912, Serial No. 696,592. Divided and this application filed August 12, 1912. Serial No. 714,622.

*To all whom it may concern:*

Be it known that I, JENS VAALER, a citizen of the United States, residing at Chicago, in the county of Cook and State of Illinois, have invented a new and useful Improvement in Latches for Type-Writer-Desk Platforms, of which the following is a specification.

My invention relates to improved supplemental means for holding in its withdrawn and raised position the platform for a typewriting machine in a desk equipped with mechanism of the kind shown and described in United States Letters Patent No. 934,861, granted to me September 21, 1909, and through the medium of which the platform may be moved forward and backward and raised and lowered, always while maintaining a horizontal position, in changing it from one to the other of its housed and withdrawn positions.

The subject of the present application is divided out of my application Serial No. 696,592, filed May 11, 1912, and allowed June 27, 1912, for improved locking means operating to secure the carriage, when the platform has been drawn out preparatory to raising it, against rearward displacement by such raising; and the purpose of my present tongue-and-keeper device is to coöperate with the bell-cranks of the aforesaid mechanism, by way of supplementing them in their function of supporting the raised platform.

In the accompanying drawings, Figure 1 is a view in vertical sectional elevation of a desk-pedestal equipped with my patented mechanism within it with the platform in its Fig. 2 is a side view of the pedestal with a portion of a wall broken away to show the mechanism within it with the platform in its withdrawn and raised position and supported by my improved tongue-and-keeper device, and Fig. 3 is a broken perspective view, in the nature of a diagram, showing the tongues on the platform and the keepers in position to receive them.

The carriage rides upon rails 5 on the opposite inner sides of a desk-pedestal, or other desired housing, and provided with catch-forming notches 6 in the lower edges of their forward-end portions; the carriage being formed of a pair of plates 7 rigidly connected by a yoke-shaped rod 8. Similar bell-cranks 9, 9 are journaled to the plates near their forward ends, and other bell-cranks 10, 10 are similarly journaled to the plates near their rear ends, the longer arms of the last-named bell-cranks being connected between their ends by a cross-rod 12, and the members 9 and 10 of each pair being pivotally connected at the ends of their shorter arms by a bent link 13. Spiral springs 14, 14 connect the yoke 8 with the cross-rod. The platform 15 is secured at its edges to bars 16, each pivotally connecting the members of a pair of the bell-cranks 9, 10 at their longer arms. A stud 17 projects outwardly from the longer arm of each bell-crank 9, and a stud 18 projects similarly from each carriage-side, or plate 7, to which latter is fulcrumed between its ends a gravity-lever 19 provided with a tongue or pawl 20 to enter a notch 6, and a latch 21 to engage a stud 17. When the platform is in its lowermost and housed position, shown in Fig. 1, the studs 17 are engaged by the latches 21 to lock the bell-cranks against turning, the obstruction which the rails present to the pawls 20 preventing the levers 19 from turning by gravity to withdraw the latches from the studs. In pulling the platform outwardly, the working of the parts is so timed that, in the extreme advanced position of the carriage, whence raising of the platform begins, the pawls 20 are raised by dropping of the rear lever-ends, whereby the latches are lifted off the studs 17 and the pawls enter the notches 6, thus locking the carriage to the rails to prevent the strain in raising the platform from riding the carriage backwardly on the track. To house the platform from its raised and advanced position shown in Fig. 2, it is lowered to the point from which the carriage may be run backwardly on its track into the housing and locked by engagement of the latches 21 with the studs 17. In my aforesaid allowed application the parts and their operations are described in greater detail.

From the upper edge of each bar 16, near its forward end, projects a tongue 22; and on the inner faces of the forward posts of the carriage-housing or pedestal are provided keepers 23 in position to receive and confine the tongues in the raised position of the platform. The keeper is an outwardly-bulging angular plate secured through its edge-portions in operative position and formed with a longitudinal central recess 23¹ along which extends a raised finger 24, slightly curved toward its free end to guide a tongue 22 in being inserted underneath it and to hold it lightly to the face of the keeper, which is formed with cam-like edges at 25, 25, to assist in guiding the tongue into place. This tongue-and-keeper device supplements the support by the bell-cranks of the raised platform; and preparatory to lowering the platform from that position for housing it, as described, it is pulled outwardly far enough to release the tongues from the keepers.

What I claim as new and desire to secure by Letters Patent is—

1. A supplemental platform-supporting device for the purpose set forth, comprising a bar having a rigid projecting tongue on one edge, and a keeper formed of a bulging plate provided with a finger struck therefrom for releasably confining the tongue against the plate.

2. A supplemental platform-supporting device for the purpose set forth, comprising a bar having a rigid projecting tongue on one edge, and a keeper formed of a recessed bulging plate with a finger extending over the recess and having cam-edges at opposite sides of the recess-entrance leading to the finger.

JENS VAALER.

In presence of—
L. HEISLAR,
R. SCHAEFER.